(12) United States Patent
Filatov

(10) Patent No.: US 7,020,320 B2
(45) Date of Patent: Mar. 28, 2006

(54) EXTRACTING TEXT WRITTEN ON A CHECK

(75) Inventor: Alexander Filatov, Longmont, CO (US)

(73) Assignee: Parascript, LLC, Boulder, CO (US)

( * ) Notice: Subject to any disclaimer, the term of this patent is extended or adjusted under 35 U.S.C. 154(b) by 641 days.

(21) Appl. No.: 10/093,184

(22) Filed: Mar. 6, 2002

(65) Prior Publication Data

US 2003/0177100 A1    Sep. 18, 2003

(51) Int. Cl.
*G06K 9/00*    (2006.01)

(52) U.S. Cl. ...................................... 382/137
(58) Field of Classification Search ................ 382/137, 382/119, 116

See application file for complete search history.

(56) References Cited

U.S. PATENT DOCUMENTS

| | | | |
|---|---|---|---|
| 5,313,527 A | 5/1994 | Guberman et al. | 382/13 |
| 5,359,667 A | 10/1994 | Borowski et al. | 382/7 |
| 5,467,407 A | 11/1995 | Guberman et al. | 382/186 |
| 5,850,480 A | 12/1998 | Scanlon | 382/229 |
| 5,917,931 A * | 6/1999 | Kunkler | 382/137 |
| 6,845,366 B1 * | 1/2005 | Hassanein et al. | 705/45 |
| 2003/0021460 A1* | 1/2003 | Kelland | 382/137 |
| 2003/0115470 A1* | 6/2003 | Cousins et al. | 713/179 |

FOREIGN PATENT DOCUMENTS

EP    0 565 911 A2    10/1993

OTHER PUBLICATIONS

PCT International Search Report for PCT/US03/06575.
Luis G. Occena and Liang-Cheng Tang, "A logic-based framework for address interpretation and rectification," Computers in Industry, Elsevier Science Publishers, Amsterdam, NL, vol. 20, No. 1, Jul. 1, 1992.
"Classification of Machine-Printed and Handwritten Texts Using Character Block Layout Variance", Kuo-Chin Fan et al., *Pattern Recognition*, vol. 31, No. 9, pp. 1275-1284 (1998).
"Historical Review of OCR Research and Development", Shunji Mori et al., *Document Image Analysis* vol. 80, No. 7, Jul. 1992, pp. 1029-1058 (1992).

* cited by examiner

*Primary Examiner*—Kanjibhai Patel
*Assistant Examiner*—ONeal R. Mistry
(74) *Attorney, Agent, or Firm*—Merchant & Gould

(57) ABSTRACT

A check processing system for recognizing text on a check and processing the check using an interpretation for the recognized text is disclosed. The check processing system recognizes text on a check using a text recognition method wherein the text is compared to information entries in a customized recognition list stored in a restrictive lexicon. Thus, a process of creating restricted lexicons containing only customized recognition lists is disclosed. Like the text on the check, the information entries may be strings of characters, such as, without limitation, strings of numerical characters, alphabetic characters or a combination of alphabetic and numerical characters. Furthermore, the strings of characters for the text, as well as the information entries, may be a word or a phrase of words, such as payee names or memo categories. After the text is recognized, the check processing system processes the check using the interpretation by linking the check to the interpretation on an account statement.

27 Claims, 7 Drawing Sheets

EXTRACTING TEXT WRITTEN ON A CHECK

TECHNICAL FIELD

The invention relates generally to recognizing text. More particularly, the invention relates to recognizing textual images on a check.

BACKGROUND OF THE INVENTION

Banks periodically send checking account statements to customers for each checking account that a customer may have with the bank. For instance, a checking account statement for a particular checking account held by a customer is typically sent to the customer on monthly cycles. Checking account statements usually contain information identifying each check written over a given period of time. This information includes the check numbers of all checks written from the account during the given period of time, the date that each check was received by the financial institution and/or issued by the customer to a payee, and the amount of transaction of each check.

Various prior art methods for extracting machine-printed text on checks exist that provide banks the ability to process checks and update checking accounts in an efficient manner. For example, magnetic readers provide banks with the ability to efficiently extract account number information printed on checks. Account number information is typically printed on checks using magnetic ink. Such account number information, which is typically printed along the lower portion of a check, may be printed either as a series of numbers or a bar code. As a check is provided to a bank for processing, a magnetic ink reader may read the magnetic ink to identify the account from which the check was issued. Another method for extracting machine-printed textual information on a check is optical character recognition. With optical character recognition, machine-printed text is read on each check using a scanner. The text is then compared in character-by-character fashion to a general lexicon of characters. The characters from the general lexicon that most closely resemble each scanned character are output to create an interpretation for the machine-printed text.

Although there exist computerized methods for extracting machine-printed text on a check, most banks use a combination of automatic and manual processes to extract handwritten numeric information on a check. For instance, an optical character recognition machine will first attempt to read the amount of the check. Subsequently, a financial institution employee will review each check not read by the machine and input the handwritten numeric information into a computing system programmed to process the information. Unfortunately, the above-described method for extracting information is unduly time-consuming and cumbersome, often resulting in an inefficient use of human resources. As such, additional handwritten text on a check, such as payee name and memo category information, is generally not extracted and used in generating an account statement in an effort to conserve human resources.

It is with respect to these considerations and others that the present invention has been made.

SUMMARY OF THE INVENTION

In accordance with the present invention, the above and other problems have been solved by a check processing system for processing a check using an interpretation for text written on the check. Generally, the check processing system receives a check and performs a recognition analysis on text written on the check to generate an interpretation for the text. The text may be written on any area on the check, but is described herein as located on one or more information fields located on the check. The check processing system may recognize the text by comparing an image of the text to predefined information entries and selecting the information entry that most closely resembles the text. The information selected may be referred to as a textual interpretation for the text. Like the text on the check, the information entries may be strings of characters, such as, without limitation, strings of numerical characters, alphabetic characters or a combination of alphabetic and numerical characters. Furthermore, the strings of characters for the text, as well as the information entries, may be a word or a phrase of words, such as payee names or memo categories. After the text is recognized, the check processing system processes the check using the textual interpretation. For example, the textual interpretation may be used in generating an account statement to provide a more detailed account statement reflecting a link between the check and the interpretation for the text written on the check.

In accordance with another aspect, the present invention relates to a check processing procedure for recognizing text written on a check and processing the check using an interpretation for the recognized text. Initially, the check processing procedure examines the check to locate text written on the check. The text may be written on any area of the check, but as noted above, is described herein as written on one or more information fields on the check. As such, the check processing procedure may locate the text by locating a specific information field on the check. After the text is located, the check processing procedure recognizes the text using a textual recognition method to generate an interpretation for the text. The check processing procedure may perform text recognition by comparing the text to predefined information entries listed in a customized recognition list stored in a restricted lexicon. As such, the check processing procedure may extract the information entry that most closely resembles the text, wherein the extracted information entry is designated the interpretation for the recognized text. By extracting the matched information entry, the procedure effectively links the handwritten text to an interpretation for the text. The check processing procedure may perform the aforementioned comparison by using either holistic or analytic text recognition methods. Like the text on the check, the information entries may be a string of characters, such as, without limitation, a string of numerical characters, alphabetic characters or a combination of alphabetic and numerical characters. Furthermore, the string of characters for the text, as well as the information entries, may be a word or a phrase of words, such as a payee name or a memo category. Finally, the check processing procedure processes the check using the interpretation for the recognized text.

With respect to check processing, the check processing procedure may generate a financial record reflecting the link between the check and the interpretation for the recognized text on the check. For example, and not by means of limitation, the financial record may be a monthly account statement linking the check to the interpretation as well as detailing financial transactions of the checking account over a month time period. For instance, a listing for the check may be categorized under a heading labeled with the textual interpretation. Alternatively, the textual interpretation may be printed adjacent to or in close proximity to the listing on the account statement.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF A PREFERRED EMBODIMENT

The present invention and its various embodiments are described in detail below with reference to the figures. When referring to the figures, like structures and elements shown throughout are indicated with like reference numbers.

Figure 1:
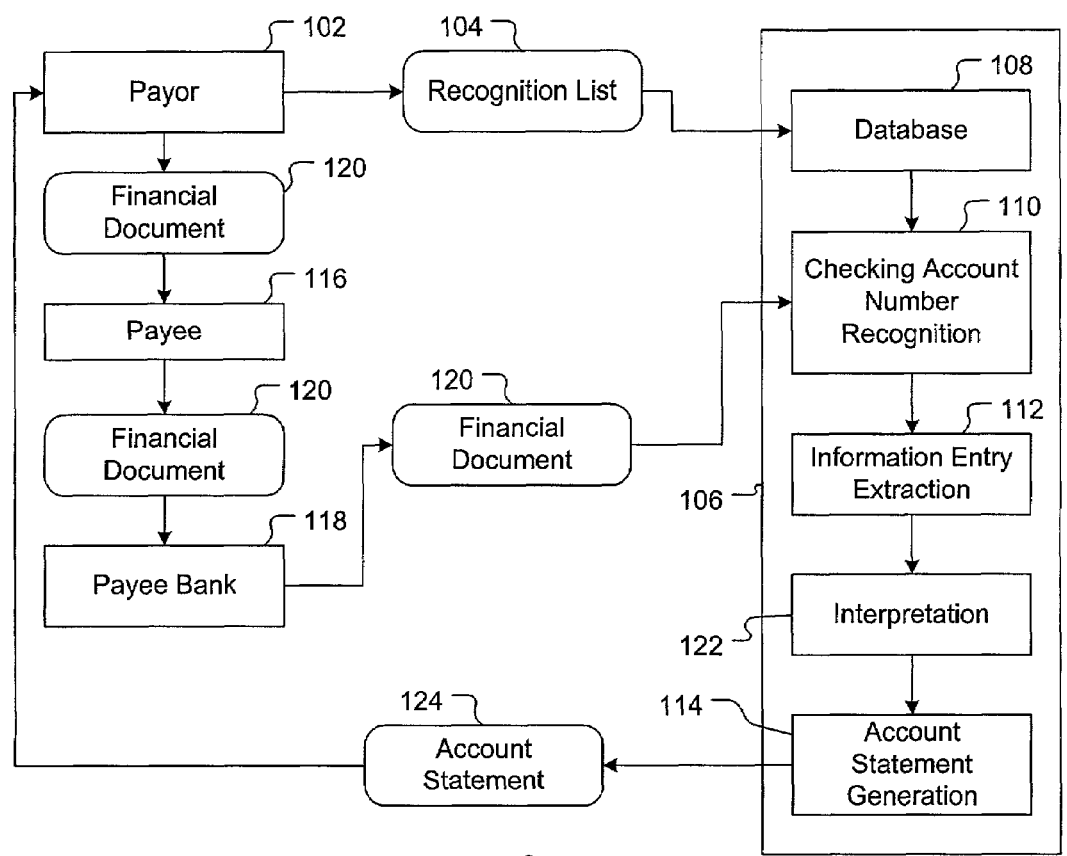
FIG. 1 is a functional diagram of a system for recognizing text on a check and processing the check using an interpretation for the recognized text in accordance with an embodiment of the present invention and the associated environment.

Referring to FIG. 1, a conceptual illustration of an embodiment of the present invention is shown. FIG. 1 shows a check processing system 106 responsible for recognizing text on a check 120 and processing the check 120 using an interpretation 122 for the recognized text in accordance with an embodiment of the present invention. More specifically, the check processing system 106 is hereafter described as a system for processing the check 120 by linking the check 120 to the interpretation 122. Depiction of the link between the check 120 and the interpretation 122 may be included on a financial record, such as, without limitation, an account statement 124, for the checking account associated with the check 120. Although the check processing system 106 is hereafter described as linking a check 120 to a particular payee or memo category, the check processing system 106 may be used to link the check 120 to any type of information that may take the form of text on the check 120. In accordance with an embodiment, the check 120 may be a financial instrument used to transfer capital funds from a particular account to a payee 116. As such, the interpretation 122 may be used in generating an account statement 124 detailing a period of transactions for the account. For illustration purposes, and not by means of limitation, the check 120 is hereafter described as being issued to a payee 116 by a payor 102. In accordance with an embodiment, the payor 102 is preferably a customer of a financial institution that guarantees the check 120 for the customer. Thus, the check 120 may be either a personal or business check. With respect to other embodiments, the check processing system 106 may be used for processing any type of financial document. For simplicity, however, the system 106 is hereafter described as processing information extracted from a check 120, such as the check 120 shown in FIG. 3 in accordance with a preferred embodiment.

The check processing system 106 may be located either at the place of business of the payor's financial institution or a location offsite to the financial institution. Indeed, the check processing system 106 may be operated and maintained by an independent operator not affiliated with the payor's financial institution and rendering check-processing services to the financial institution.

In order to utilize the check processing system 106, a payor 102 first provides a recognition list 104 to the system 106. The recognition list 104 is a customized list of words and phrases defined by either the payor or the payor's financial institution as textual information that may be printed or written on the check 120. As such, the recognition list 104 specifically does not include a general listing of words and phrases, but rather only those words and phrases that may be included on the payor's checks as handwritten or machine-printed text. In accordance with an embodiment, words and phrases of the recognition list 104 are hereinafter refined to as information entries that may take the form of information written or printed on the check 120. For example, without limitation, the information entries may include payee name words and phrases and memo category words and phrases. The recognition list 104 may include other information entries associated with other types of information that may take the form of text on the check 120. In accordance with an embodiment of the present invention, the recognition list 104 may be provided electronically to the system 106 by the payor 102 as the payor interacts with one or more Internet web pages generated by a server and maintained by either the payor's financial institution or the check processing system 106. Alternatively, the recognition list 104 may be submitted to the processing system 106 through a manual process The check processing system 106 includes a storage module 108, a checking account recognition module 110 and a payee name extraction module 112. Upon receiving the recognition list 104, the check processing system 106 stores the recognition list 104 to a restricted lexicon (not shown) associated with the payor 102. The lexicon is considered "restricted" because it preferably includes only customized recognition lists 104 for a particular payor 102. As such, the restricted lexicon does not contain general words and phrases, but rather only words and phrases included as predefined information entries in one or more recognition lists 104 stored in the restricted lexicon. The restricted lexicon is stored in a storage module, or database 108. Generally, the check processing system 106 may receive one or more recognition lists 104 from multiple payors 102, and thus, the database 108 may store a restricted lexicon for each payor 102. Each restricted lexicon stored in the database 108 may be associated with and, thus, referenced by a checking account number pertaining to a specific payor's checking account to which the restricted lexicon is assigned. It should be appreciated that a payor 102 may have multiple checking accounts serviced the check processing system 106, and thus, multiple lexicons associated with the payor 102. For illustration purposes and not by means of limitation, the check processing system 106 is shown in FIG. 1 as receiving a single recognition list 104 from a single payor 102.

In accordance with an embodiment of the present invention, the recognition list 104 may contain information entries associated with multiple information types, i.e., payee name and memo category information. Alternatively, the restricted lexicon may contain multiple recognition lists 104 that store information entries associated with multiple information fields on a check 120. For instance, the restricted lexicon may store a payee name recognition list 104 and a memo category recognition list 104. The types and number of recognition lists 104 contained in the restricted lexicon may be determined based on information submitted to the check processing system 106 by the payor 102. As noted above, for illustration purposes, the check processing system 106 is hereafter described as receiving a single recognition list 104 submitted by one payor 102, wherein the recognition list 104 may contain information entries associated with both payee name and memo category information.

After the recognition list 104 is received by the check processing system 106, a check 120 issued by the payor 102 to a payee 116 may be submitted to the check processing system 106. As described above, the check 120 may be any form of negotiable instrument, such as, without limitation, a personal or a business check 120. The payee 116 may deposit the check 120 into the payee's financial institution 118 for satisfaction of the transaction purported by the check 120. The payee's financial institution 118 then submits the check 120 to the payor's financial institution for processing of the check 120. Alternatively, the payee 116 may submit the check 120 directly to the payor's financial institution for processing. Processing may refer to any type of operation related to performance of a transaction purported by the check, such as, without limitation, recordation of the transaction, withdrawal or transfer of funds to/from the checking account, deposit of funds to the checking account and linking the check 120 to an interpretation for recognized text on the check 120 and generation of an account statement for the checking account from which the check is written. Regardless of whether the payee deposits the check 120 directly with the payor's financial institution or through his/her institution 118, for the payee 116 to reap the benefits of the transaction purported by the check 120, the check 120 should, at some point in time, be submitted to the payor's bank, either directly by the payee 116 or by another financial institution 118.

In accordance with an embodiment of the present invention, the check 120, or a copy thereof, whether an electronic or hard copy, is received into the check processing system 106 such that the system 106 may process the check 120 using one or more interpretations for text recognized on the check 120. Once received into the system 100, a checking account number recognition module 110 examines the check 120 to locate the checking account number printed on the check 120. Once located, the checking account number recognition module 110 performs recognition methods to recognize the checking account number is recognized. In accordance with a preferred embodiment, the checking account number recognition module 110 utilizes a magnetic reader to extract the checking account number from the check 120. As such, the checking account number is printed in magnetic ink on the check 120 and the actual check, and not a copy thereof, is received into the check processing system 106. Alternatively, the checking account number recognition module 110, may utilize optical character recognition to extract the checking account number. Once the checking account number is recognized, the checking account number recognition module 110 retrieves the restricted lexicon associated with the checking account from which the check is issued.

An information entry extraction module 112 compares text on information fields of the check 120 to information entries listed in an associated recognition list 104 stored in the restricted lexicon. For example, if the check processing system 106 is operating to identify the payee name on the check 120, a payee name information field on the check 120 may be located and text written or printed on the payee name information field may be compared against a payee name recognition list 104 in the restricted lexicon. An information field may be defined as a field on the check 120 containing text related to information associated with the check 120, such as, without limitation, payee identification, memo category identification, pay amount identification, checking account identification and payor demographic information.

The information entry extraction module 112 preferably compares the text, either hand-written or machine-printed, on an information field of the recognition list 104. The information entry extraction module 112 may compare the text to each information entry before extracting the information entry that most closely resembles the text on the information field. The information entry that most closely resembles the text may be referred to as a textual interpretation 122 for the text.

The interpretation 122 may be output from the information entry extraction module 112 to an account statement generation module 114, which as described in more detail below, processes the check 120 to generate an account statement 124. In accordance with an embodiment of the present invention, the interpretation 122 may be used to generate an account statement 124 depicting the link between the check 120 and the interpretation 122 in a manner readily noticeable to the payor 102. The account statement 124 may be provided to the payor 102 as either an electronic or hard copy. If provided as an electronic copy, the statement 124 may be presented to the payor through either an application program, such as, without limitation, a word processor or a spreadsheet program, or an Internet-based web page. An account statement 124 is an exemplary illustration, and in accordance with other embodiments, may be replaced by any form of financial record that may be accessed by the payor 102 and to which the check 120 may be associated with the interpretation 122 for the recognized text.

The account statement 124 preferably details financial transactions associated with the payor's checking account and may list each check 120 issued by the payor 102 over a specified time period. For example, a monthly checking account statement 124 typically includes a listing of each check 120 issued by the payor 102 during a 30 or 31-day cycle. Thus, in accordance with an embodiment of the present invention, the check processing system 106 may link a check 120 to, or associate a check 120 with, one or more interpretations 122. Indeed, the link between the check 120 and the interpretation 122 may be used by the statement generation module 114 to format a listing of the check 120 as the listing appears on the account statement 124. Formatting of the listing on the account statement 124 may be by any means, but for illustration purposes, is described herein as either categorizing the listing under a heading labeled as the interpretation 122 or marking/labeling the listing by printed notation of the interpretation 122 adjacent to or in close proximity to the listing. In an exemplary embodiment, the interpretation 122 may be used to identify that the check 120 was issued to a specific payee 116. As such, the interpretation 122 may be derived from a payee name information entry. Likewise, the interpretation 122 may also be used to categorize the check 120 in a particular category identified by a memo category information entry extracted as an interpretation 122.

Figure 2:
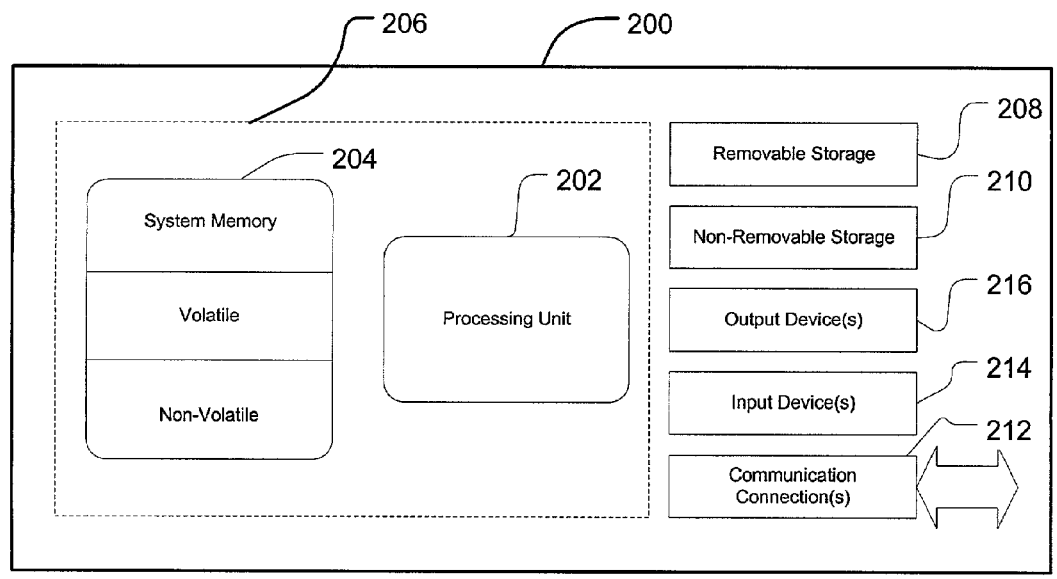
FIG. 2 illustrates a computing environment in which the various embodiments of the invention may operate.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or palm-sized devices, tablet devices, laptop devices, multiprocessor systems, microprocessor-based systems, set top boxes, programmable consumer electronics, network PCs, minicomputers, mainframe computers, distributed computing environments that include any of the above systems or devices, and the like.

In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210.

Memory 204, removable storage 208 and non-removable storage 210 are all examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media or computer program product as used herein includes both storage media and communication media.

Device 200 may also have input device(s) 214 such as keyboard, mouse, pen, voice input device, touch screen input device, check scanners etc. Output device(s) 216 such as a display, speakers, printer, electromechanical devices, such as check handlers, controlled by device 200, may also be included. All these devices are well known in the art and need not be discussed at length here. The particular input/output device working with the computing device 200 will depend on the application in which the recognition system is working and whether the recognition is system is working offline or online with cursive images being recognized.

Figure 3:
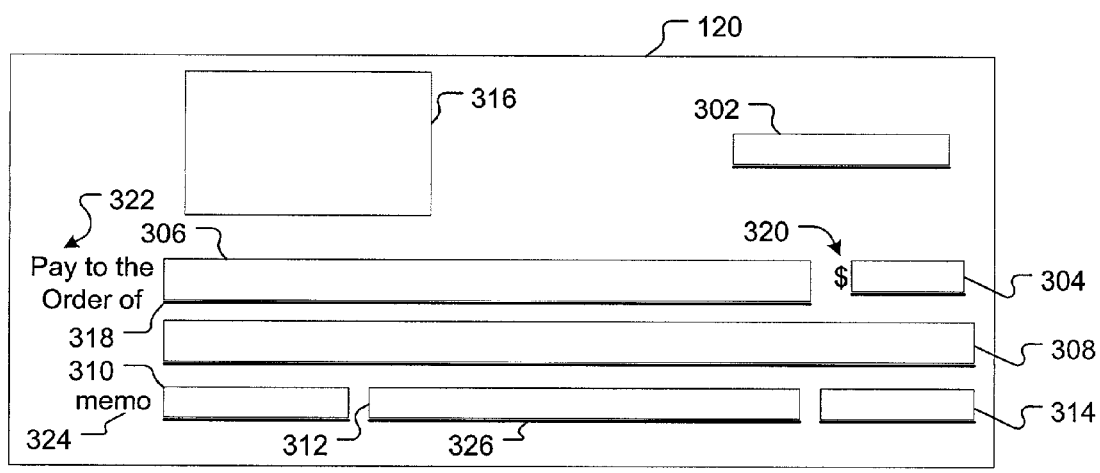
FIG. 3 is a functional diagram of a check having information fields that may contain text in accordance with an embodiment of the present invention.

FIG. 3 shows a check 120 having information fields that may contain text in accordance with an embodiment of the present invention. As described above, the check 120 is submitted to the check processing system 106 for recognition of text written or printed on the check 120. Although the check 120 submitted to the check processing system 106 may be any form of a negotiable instrument, the check 120 is shown in FIG. 3 as a personal or business check. For illustration purposes, the check 120 is hereafter referred to as a personal check having various information fields as described below.

The personal check 120 includes a date information field 302, a numerical pay amount information field 304, a payee name information field 306, an alphanumeric pay amount information field 308, a memo category information field 310, an account number information field 312, a signature information field 314 and an address information field 316. The payee name information field 306 is shown located above a payee name input line 318 in accordance with one embodiment of the present invention. The payee name input line 318 may be located adjacent to and slightly below a dollar sign 320 adjacent to the numerical pay amount information field 304. As such, the payee name field 306 is shown located directly above the payee name input line 318. Likewise, the date field 302, the numerical pay amount field 304, the alphanumeric pay amount field 308, the memo category field 310, and the signature field 314 are also shown located directly above an input line. The input lines may be used to identify areas on the check where text, whether handwritten or machine printed, is to be printed such that the text is located on an information field. As described above, text may comprise alphabetic characters, numerical characters or a combination of alphabetic and numerical characters.

Whereas the numerical pay amount information field 304 preferably only includes numerical text, the alphanumeric pay amount information field 308 may contain both alphabet text and numerical text. The payee name information field 306 may be located directly adjacent to a text block 322 containing the phrase 'Pay to the Order Of,' as shown in FIG. 3. The text block 322 may be positioned adjacent to the payee name information field 306 such that the printed payee name completes the phrase "Pay to the Order Of."

By arranging the payee name information field 306 in this manner, a check processing procedure, such as the procedure described in FIG. 4, below, may locate payee name information written or printed on the personal check 120 by locating the positions of the dollar sign 320 and the input line 318. Alternatively, such a check processing procedure may find the printed payee name by locating the positions of the text block 322 and the input line 318. Likewise, the memo category text may be found by such a procedure by locating the text block 324, which, as shown in FIG. 3, is preferably printed adjacent to the memo category information field 310. Other forms of information, such as a payor's signature, alphabetic pay amount, address information and date information may be determined in similar fashion by the check processing procedure shown and described below in FIG. 4 as the procedure locates an input line directly below each respective information field.

With the computing environment in mind (See FIG. 2), the logical operations of the various embodiments of the present invention are implemented (1) as a sequence of computer implemented steps running on a computing system and/or (2) as interconnected machine logic modules within the computing system. The implementation is a matter of choice dependent on the performance requirements of the computing system implementing the invention. Accordingly, the logical operations making up the embodiments of the present invention described herein are referred to variously as operations, steps or modules. It will be recognized by one skilled in the art that these operations, steps and modules may be implemented in software, in firmware, in special purpose digital logic, and any combination thereof without deviating from the spirit and scope of the present invention as recited within the claims attached hereto.

Figure 4:
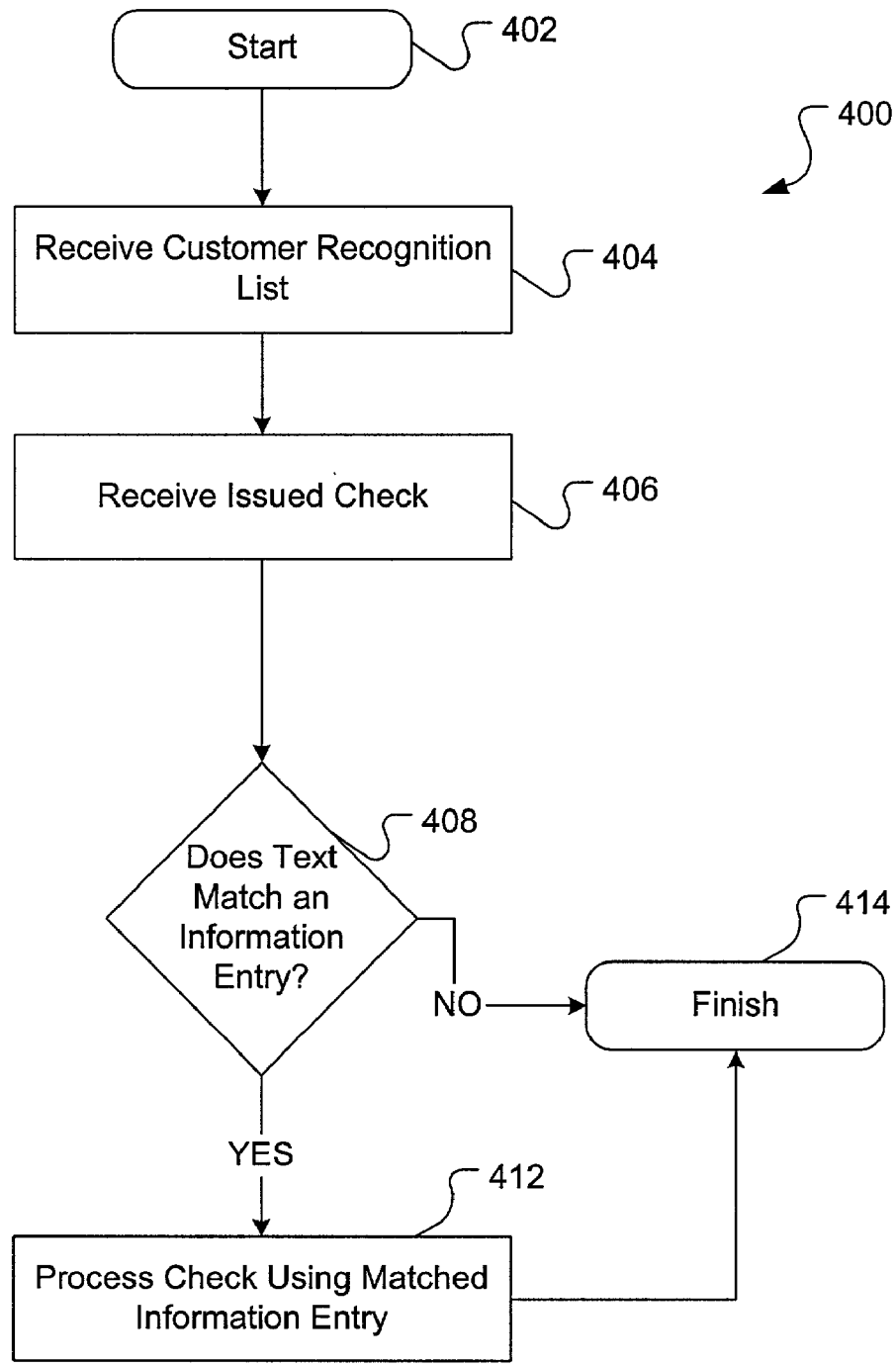
FIG. 4 is a flow diagram that illustrates operational characteristics for recognizing text on a check and processing the check using an interpretation for the recognized text in accordance with an embodiment of the present invention.

FIG. 4 illustrates a check processing procedure 400 for recognizing text on a check 120 using a restricted lexicon and processing the check 120 using an interpretation for the recognized text in accordance with an embodiment of the present invention. In particular, the check processing procedure 400 illustrates operational characteristics for linking a check 120 to an interpretation for recognized text on the check 120. It should be appreciated, however, that the check processing procedure 400 might also be used in similar fashion to process a check 120 in any other manner. The check processing procedure 400 comprises an operation flow beginning with a start operation 402 and concluding with a terminate operation 414. For simplicity, the check processing procedure 400 is described below as linking a check 120 to only one type of information. Thus, the check processing procedure 400 described in FIG. 4 generates a single interpretation to which a check 120 is linked. Furthermore, FIG. 4 is described with reference to a single payor 102 and a single check 120 issued by the payor 102 to a payee 116. Operation flow passes from the start operation 402 to a list reception operation 404.

The list reception operation 404 receives a recognition list 104 submitted by the payor 102. In accordance with an embodiment of the present invention, the recognition list 104 may include information entries associated with more than one type of information that may take the form of text written or printed on a check 120. For instance, and by means of illustration of an exemplary embodiment, the recognition list 104 may include both payee name entries and memo category entries corresponding to words or phrases for payee names or memo categories, respectively. In accordance with an alternative embodiment, the recognition list 104 may be a list compiling information entries associated with a single type of information that may take the form of text on a check 120. As such, the recognition list 104 may only contain payee name information entries. Once the recognition list 104 is received, the list 104 is stored in a restricted lexicon associated with a checking account number specified with the recognition list 104. Operation flow passes from the list reception operation to a check reception operation 406.

The check reception operation 406 receives the check 120 issued to the payee 116. The payee 116 may deposit the check 120 directly to the payor's financial institution for a funds transfer from the payor's financial institution to the payee 116. The payee 116 may also deposit the check to the payee's financial institution 118, which, in turn will submit the check 120 to the payor's financial institution for a funds transfer from the payor's financial institution to the payee's financial institution 118. Regardless of where the check 120 is deposited, the check 120, or a copy thereof, either an electronic or hard copy, is received by the check reception operation 406. Operation flow then passes from the check reception operation 406 to a match operation 408.

The match operation 408 compares text written or printed on information fields on the check 104 to information entries in the recognition list 104 received by the list reception operation 404. As described in more detail below, if the check processing procedure 400 services more than one checking account, the restricted lexicon storing the recognition list 104 may be selected based on a checking account number printed on the check 120. The recognition list 104 may contain information entries for all information fields on the check 120. In accordance with an exemplary embodiment, the recognition list 104 contains at least information entries associated with payee name and memo category information. Alternatively, each restricted lexicon may contain a recognition list 104 associated with each information field on the check 120. For instance, the restricted lexicon may have a payee name recognition list 104 as well as a memo category recognition list 104. The match operation 408 may compare either one of these recognition lists 104 to text on the payee name information field 306 or the memo category information field 310, respectively. For simplicity, however, the check processing procedure 400 is described below as the match operation 408 compares text on the payee name information field 306 to a recognition list 104 containing both payee name and memo category information entries.

The match operation 408 determines whether a match exists between text written or printed on the located information field and the information entries compiled in the recognition list 104. As such, in the illustration described above, the match operation 408 determines whether the text on the check 120 closely matches an information entry listed in the recognition list 104. In accordance with an embodiment, the closely matched entry may be referred to as an interpretation 122 for the recognized text. The match operation 408 may use either a holistic text recognition method or an analytical text recognition method in recognizing whether a match exists between the text and the information entries listed in the recognition list 104 stored in the checking account lexicon. Both holistic and analytical text recognition are well-known methods for text recognition, and thus are not discussed in detail herein. For example, holistic script recognition using metastrokes is discussed, in U.S. Pat. No.

5,467,407, issued Nov. 14, 1995, and U.S. Pat. No. 5,313, 527, issued May 17, 1994, both to Guberman et al.

If a match is found by the match operation 408, operation flow passes to a link operation 412. The link operation 412 links the check 120 to, or associates the check 120 with, the interpretation 122 for the recognized text. Indeed, the link operation 412 may generate a financial record, i.e., an account statement 124, detailing the link between the check 120 and the interpretation 122. In accordance with an embodiment, the link operation 412 may categorize a listing of the check 120 on an account statement 124 under a heading labeled as the interpretation 122. Alternatively, the link operation 412 may print the interpretation adjacent to the listing of the check 120 on the account statement 124. The aforementioned examples have been provided for illustration purposes only and should not be considered as limiting to the scope of the present invention. Thus, it should be appreciated that the link operation 412 may link the check 120 to the interpretation 122 by any means which may be readily noticeable to the payor, the payor's bank, an employee of the payor's bank, any processing system or any other machine/entity that may use the association to perform some task associated with the check 122. Indeed, the link between the check 120 and the interpretation 122 may be used by a computer system at the payor's financial institution for various processing services that may be associated with operations other than account statement generation. Following the link operation 412, operation flow passes to the terminate operation 414.

Figure 5:
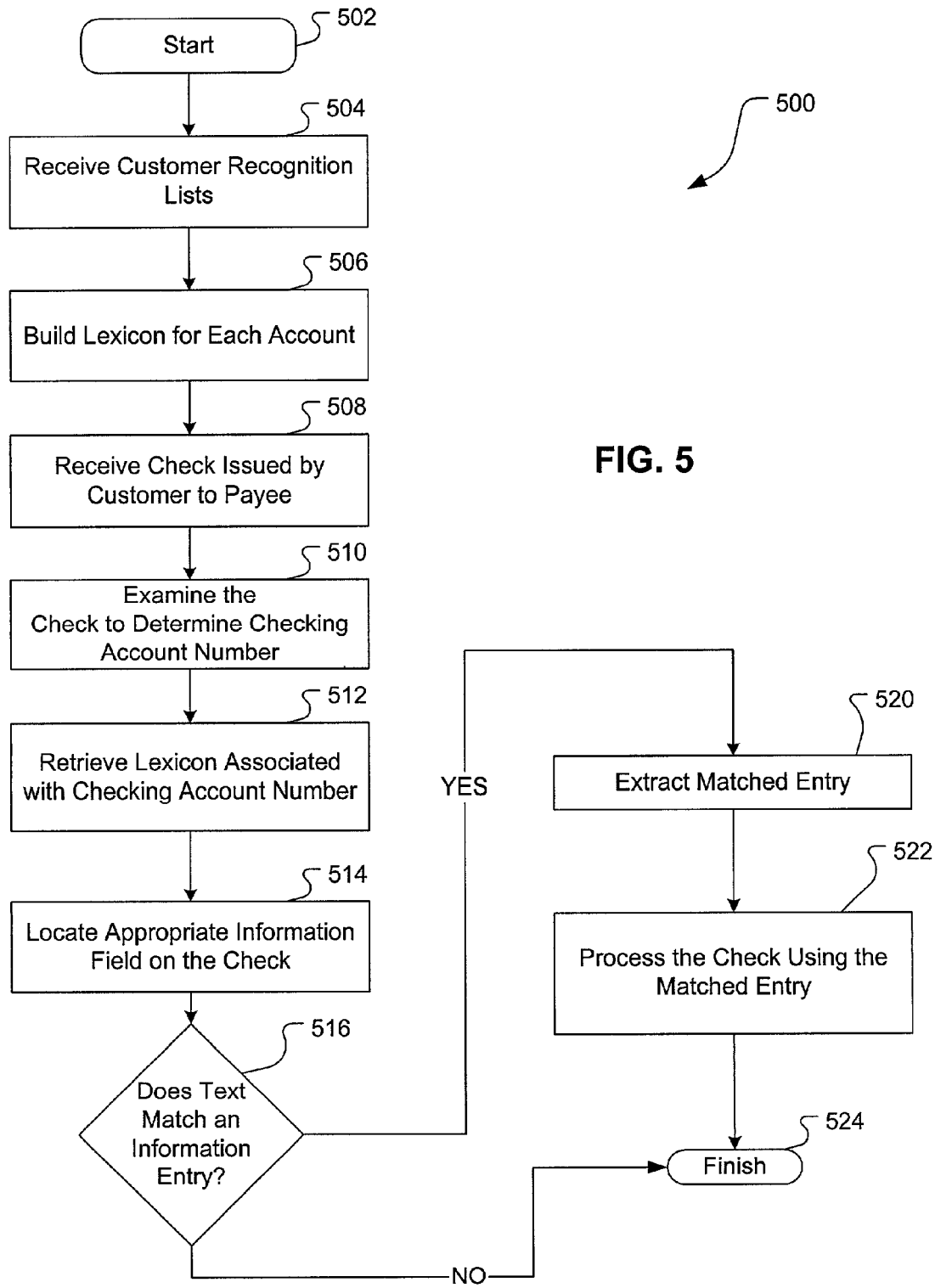
FIG. 5 is a flow diagram that illustrates operational characteristics shown in FIG. 4 in more detail in accordance with an embodiment of the present invention.

FIG. 5 is an check processing procedure 500 more particularly illustrating operations shown in the check processing procedure 400 for recognizing text on a check 120 using a restricted lexicon and processing the check 120 using an interpretation for the recognized text in accordance with an embodiment of the present invention. In particular, the check processing procedure 500 illustrates operational characteristics for linking a check 120 to an interpretation 122 for recognized text on the check 120 and generating a financial record, i.e., an account statement 124, detailing the link between the check 120 and the interpretation 122. It should be appreciated, however, that the check processing procedure 500 might also be used in similar fashion to process a check 120 in any other manner. The check processing procedure 500 may link a check 120 to any type of information that may take the form of text on a check 120. The type of information to which the check 120 is to be linked to may depend upon account statement customization preferences pre-selected by either the payor 102 or the payor's financial institution. Although the check processing procedure 500 is described below as being utilized to link a check 120 to either payee name information or memo category information, the process 500 may be used to link the check 120 to any other type of information. Of course, the check processing procedure 500 may be utilized to link the check 120 to more than one type of identification information. Although the check processing procedure 500 is shown receiving multiple payor recognition lists 104 from a variety of payors 102, for simplicity, the check processing procedure 500 is described as receiving only one check 120.

The check processing procedure 500 includes an operation flow beginning with a start operation 502 and concluding with a terminate operation 524. From the start operation 502, operation flow passes to a list reception operation 504. The list reception operation 504 may receive multiple recognition lists 104 associated with multiple checking accounts. Each recognition list 104 contains information entries in the form of words or phrases associated with information to which the list 104 is related. As such, if the recognition list 104 contains payee name information entries and memo category entries, the list 104 is thus related to payee name and memo category information. As described above, the list reception operation 504 may receive any number of recognition lists 104 from any number of payors 102 having checking accounts with the same financial institution. Furthermore, a payor 102 may have more than one checking account with the same financial institution. The recognition lists 104 may be related to any type of information that may take the form of text on a check 120. For instance, the list reception operation 504 may receive a payee name recognition list 104 or a memo category recognition list 104 in accordance with various embodiments of the present invention. However, in accordance with an exemplary embodiment, the list reception operation 504 receives recognition lists 104 related to multiple types of information that may take the form of text on a check 120. For instance, each recognition list 104 received by the list reception operation 504 may be related to both payee name and memo category information, and thus, contain both payee name information entries and memo category entries.

Operation flow passes from the list reception operation 504 to a build lexicon operation 506. The build lexicon operation 506 constructs restricted lexicons used in storing recognition lists associated with specific checking accounts. As such, the build lexicon operation 506 builds at least one restricted lexicon for each payor 102 that submits a recognition list 104 to the system 106. Each restricted lexicon may store an infinite number of recognition lists 104, which may relate to any type of information that may take the form of text written or printed on a check 120. More particularly, each restricted lexicon may be identified with a checking account number specifying a specific checking account for each payor 102. As such, a payor 102 may have more than one checking account and, therefore, may be associated with multiple checking account numbers and restricted lexicons. Each restricted lexicon may be built to store any type of recognition list 104, such as, without limitation, a payee name recognition list 104, a memo category recognition list 104 or any other recognition list 104 that may compile information entries associated with any type of information that may take the form of text on a check 120. Regardless of the number or types of recognition lists 104 stored in a restricted lexicon, each restricted lexicon is identified with a single checking account. Once a restricted lexicon is constructed by the build lexicon operation 506, operation flow passes to a check reception operation 508.

The check reception operation 508 receives a check 120, or a copy thereof. In accordance with an embodiment of the present invention, the check 120 is hereafter described as a negotiable instrument, such as, without limitation, a personal check. The check 120 may be directly deposited to the check processing system 106 by the payee 116 to whom the check is issued, or alternatively, the check 120 may be submitted to the check processing system 106 by the payee's financial institution 118. Regardless of how the check 120, or copy thereof, is submitted to the check processing system 106, the check 120 is received into the check processing system 106 such that information fields on the check 120 may be located and evaluated as described below. Following the check reception operation 508, operation flow passes to an examine operation 510.

The examine operation 510 examines the check 120 to locate the checking account number associated with the check 120. As described above, the checking account number may be located within a checking account number information field 312 on the check 120. As such, in order to examine the checking account number, the examine operation 510 may first locate the checking account number information field 312. The checking account number information field 312 is typically located in the same position on all personal checks. In accordance with an embodiment, this position may be used by the examine operation 510 to locate the account number information field 312. Once the checking account number is located by the examine operation 510, operation flow passes to a retrieve operation 512. The retrieve operation 512 retrieves the restricted lexicon that is associated with the checking account number located by the examine operation 510. Operation flow passes from the retrieve operation 512 to a locate operation 514.

The locate operation 514 examines the check 120 to locate a specific information field containing the type of information to which the check 120 is to be linked to. As described above, the type of information to which the check 120 is to be linked to may depend upon account statement customization preferences pre-selected by either the payor 102 or the payor's financial institution. For instance, the check processing procedure 500 may be directed to link checks 120 of a particular checking account to payee name information written or printed on each check 120 received by the check reception operation 508. As such, the locate operation 514 may be used to locate a payee name information field 306 on the check 120. Likewise, if the check is to be linked to memo category information written or printed on the check 120, the locate operation 514 locates the memo category information field 310 on the check 120. The aforementioned examples are provided for illustration purposes only, and therefore, should not be construed to limit the scope of the present invention. Indeed, the check 120 may be associated with any type of information that may take the form of text written or printed on the check 120. As such, the locate operation 514 may locate the information field on which any type of text may be written. Once the appropriate information field is located, operation flow passes to a match operation 516.

In accordance with an embodiment, the match operation 516 compares text written or printed on the located information field to information entries stored in the recognition list 104 of the restricted lexicon retrieved by the retrieve operation 512. In accordance with an alternative embodiment wherein multiple recognition lists 104 are compiled in the restricted lexicon with each recognition list 104 being related to a distinct information type, the match operation 516 may compare the text on the information field to information entries in a specific recognition list 104 stored in the restricted lexicon. The recognition list 104 may be selected based on which information field is located by the locate operation 514. For example, if the payee name information field 306 is located by the locate operation 514, a payee name recognition list 104 stored in the restricted lexicon is the list 104 to which the text on the payee name information field 306 is compared by the match operation 516. Likewise, if the memo category information field 310 is the information field located by the locate operation 514, a memo category recognition list 104 stored in the restricted lexicon is the list 104 to which the text on the memo category information field 310 is compared by the match operation 516. As noted above, it should be appreciated that the locate operation 514 and the match operation 516 may locate and compare, respectively, any information field and any recognition list 104 compiling information entries associated with any type of information that may take the form of text, either printed or handwritten, on a check 120.

The match operation 516 then determines whether a match is found between the text written or printed on the located information field and the information entries stored in the appropriate recognition list 104 of the retrieved lexicon. The match operation 516 may use either a holistic text recognition method or an analytical text recognition method in recognizing whether a match exists between the text and the information entries compiled in the recognition list 104. Both holistic and analytical text recognition are well-known methods for text recognition, and thus are not discussed in detail herein. As noted above, holistic script recognition using metastrokes is discussed, in U.S. Pat. No. 5,467,407, issued Nov. 14, 1995, and U.S. Pat. No. 5,313,527, issued May 17, 1994, both to Guberman et al. If a match is found between text on the located information field and the information entries of the recognition list 104, operation flow passes to an extract operation 520.

The extract operation 520 extracts the information entry matched to the text as an interpretation 122 for the text 122. Following the extract operation 520, operation flow passes to a link operation 522. The link operation 522 actually identifies the check 120 as being associated with the interpretation, i.e., the extracted information entry. In accordance with an exemplary embodiment, the link operation 522 may generate an account statement 124 depicting the link between the check 120 and the interpretation 122. For example, categorization of the check 120 under a category heading, which may be labeled as the interpretation 122, may readily depict the link between the check 120 and the interpretation 122. In this manner, the check 120 may be listed together with other checks linked to the same interpretation 122. For example, several checks 120 may be linked to the same payee 116 to which the checks 120 were issued. That is, all checks 120 listed on the account statement 124 may be listed under a single "payee name" heading. As another example, several checks 120 may be associated with the same memo category. That is, all checks 120 listed on the account statement 124 may be listed under a single "memo category" heading, such as, for example, a utilities category heading where all checks 120 issued to a utilities entity may be categorized. The check 120 may also be depicted as linked to the interpretation 122 by printed notation adjacent to the check listing on the account statement 124. For instance, the listing of the check 120 may have a payee name noted adjacent to or in close proximity to the listing on the account statement 124. Likewise, the listing may have a memo category noted adjacent to or in close proximity to the listing on the account statement 124. Regardless of the means for depicting an association, the link operation 522 (in some form or fashion) may link the check 120 to the interpretation 122 for the check 120 such that a payor 102 may examine an account statement 124 and readily notice the link between the check 120 an the interpretation 122.

In accordance with another embodiment, the link operation 522 may associate the check 120 with the interpretation 122 such that an employee or computer system of the payor's financial institution may readily notice the link between the check 120 and the interpretation 122 as the employee or computer system performs some task related to processing the transaction prescribed by the check 120. Following the link operation 522, operation flow concludes with a terminate operation 524. In contrast, if the match operation 516 determines that a match is not found, operation flow passes directly to the terminate operation 524 and the check 120 is not linked to any particular interpretation 122 for the text.

Figure 6:
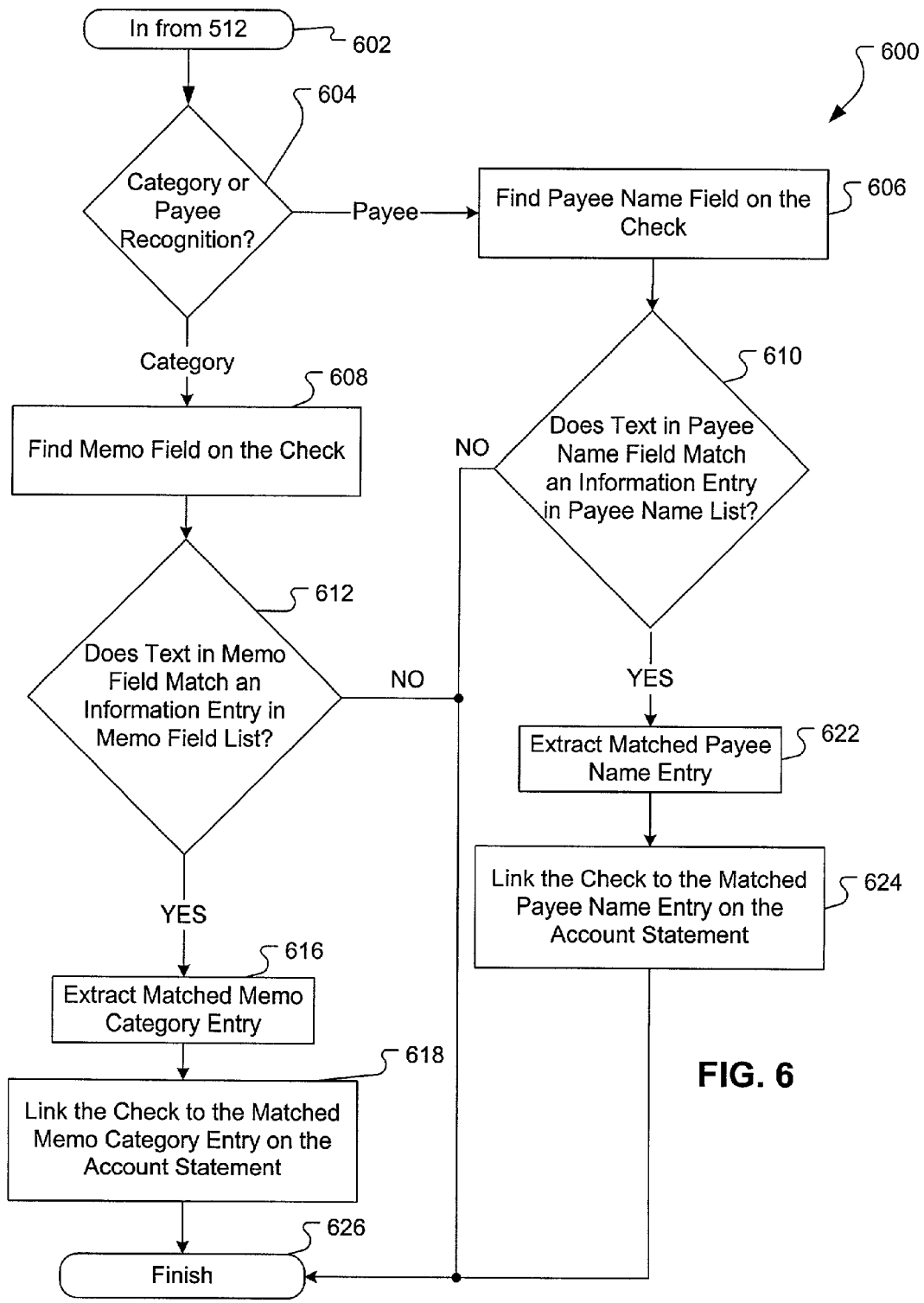
FIG. 6 is a flow diagram that illustrates operational characteristics for selecting a type of information to which a check is to be linked to in accordance with an embodiment of the present invention.

FIG. 6 is a flow diagram more particularly illustrating operations for linking a check 120 to either extracted payee name information or extracted memo category information in accordance with an embodiment of the present invention. Specifically, the flow diagram shown in FIG. 6 illustrates an information selection process 600 of the check processing procedure 500 for selecting a type of information to which the check 120 is to be linked to in accordance with an embodiment of the present invention. Although the information selection process 600 is shown in FIG. 6 as linking the check 120 to a single type of information, i.e., either payee name information or memo category information, the process 600 may be used multiple times in linking the check 120 to interpretations 122 for more than one information type. Furthermore, as noted above, the information selection process 600 may be used to link a check 120 to an interpretation 122 of text related to any type of information that may be written or printed on the check 120.

The information selection process 600 comprises an operation flow beginning with a start operation 602 and concluding with a terminate operation 626. Operation flow begins at the start operation 602 following the retrieve operation 512. Operation flow passes from the start operation 602 to a query operation 604. The query operation 604 determines whether the check processing procedure 500 is to be utilized to link the check 120 to memo category identification information or payee name identification information. As described above, either the payor 102 or the payor's financial institution may direct the check processing procedure 500 to link the check 120 to one or more specific types of information. Thus, if the check processing procedure 500 is instructed to link the check 120 to multiple types of information, the information selection process 600 may be performed as many times as needed to guarantee such multiple association.

For illustration purposes, and not by means of limitation, the information selection process 600 describes a situation wherein the check processing procedure 500 is instructed to link a check 120 to either payee name information or memo category information. As such, the information selection process 600 may be used by the check processing procedure 500 to determine whether the check processing procedure 500 is to link the check 120 to either payee name information or memo category information. Thus, the query operation 604 makes such a determination based on instructions input by either the payor 102 or the payor's financial institution. If the query operation 604 determines that the information selection process 600 is to be used to link the check 120 to memo category identification information, operation flow passes to a locate memo field operation 608. The locate memo field operation 608 locates the memo category information field 310 on the check 120. From the locate memo field operation 608, operation flow passes to a match operation 612.

The match operation 612 compares text written or printed on the memo category information field 310 to the information entries listed in the memo category recognition list 104 stored in the restricted lexicon associated with the checking account number. Although the match operation 612 is described in FIG. 6 as comparing text on the memo category information field 310 to a recognition list 104 containing only memo category information entries, it should be appreciated that the match operation 612 may compare the text on the memo category information field 310 to a recognition list 104 containing both payee name and memo category information entries. As described above, the appropriate restricted lexicon is retrieved by retrieve operation 512. The match operation 612 then determines whether the text printed or written on the memo category information field 310 matches an information entry in the memo category recognition list 104. As described above, the match operation 612 may use either a holistic text recognition method or an analytical text recognition method in recognizing whether a match exists between the text and the information entries listed in memo category recognition list 104. Both holistic and analytical text recognition are well-known methods for text recognition, and thus are not discussed in detail herein. As further noted above, holistic script recognition using metastrokes is discussed, in U.S. Pat. No. 5,467,407, issued Nov. 14, 1995, and U.S. Pat. No. 5,313,527, issued May 17, 1994, both to Guberman et al. If a match is found, operation flow passes to an extract operation 616. The extract operation 616 extracts the memo category information entry matched to the text on the memo category field 310. Operation flow passes from extract operation 616 to a link operation 618.

The link operation 618 identifies the check 120 as being associated with the memo category information entry extracted by the extract operation 616 by linking the check 120 to the extracted information entry. As described above, the link operation 618 may link the check 120 to the memo category information entry by categorizing a check listing on an account statement 124 for the checking account. As such, the check listing may be included with other check listings defining checks containing text matching the same memo category information entry extracted by the extract operation 616. Alternatively, the check 120 may be identified as being linked to the memo category information entry on an account statement 124 by the memo category information entry being printed next to the check listing. It should be appreciated that there may be many other means for linking the check 120 to the memo category information entry. If the match operation 612 does not find a match for the text on the memo category information field 310, or following the link operation 618, operation flow concludes with a terminate operation 626.

Referring back to the query operation 604, if the query operation 604 determines that the check processing procedure 600 is to be used to link a check 120 to payee name information, operation passes to a locate payee name field operation 606. The locate payee name field operation 606 locates the payee name information field 306 on the check 120. From the locate payee name field operation 606, operation flow passes to a match operation 610.

The match operation 610 compares text written or printed on the payee name field 306 to the information entries listed in the payee name recognition list 104 stored in the restricted lexicon associated with the checking account number. Although the match operation 610 is described in FIG. 6 as comparing text on the payee name information field 306 to a recognition list 104 containing only payee name information entries, it should be appreciated that the match operation 610 may compare the text written or printed on the payee name information field 306 to a recognition list 104 containing both payee name and memo category information entries. As described above, the appropriate restricted lexicon is retrieved by retrieve operation 512. The match operation 610 then determines whether the text written or printed on the payee name information field 306 matches an information entry in the payee name recognition list 104. As described above, the match operation 610 may use either a holistic text recognition method or an analytical text recognition method in recognizing whether a match exists between the text and the information entries stored in the restricted lexicon retrieved by the retrieve operation 512. Both holistic and analytical text recognition are well-known methods for text recognition, and thus are not discussed in detail herein. As further noted above, holistic script recognition using metastrokes is discussed, in U.S. Pat. No. 5,467,407, issued Nov. 14, 1995, and U.S. Pat. No. 5,313,527, issued May 17, 1994, both to Guberman et al. If a match is found, operation flow passes to an extract operation 622. The extract operation 622 extracts the payee name information entry matched to the text on the payee name information field 306. Operation flow passes from the extract operation 622 to a link operation 624.

The link operation 624 identifies the check 120 as being associated with the extracted payee name information entry by linking the check 120 to the extracted entry. As described above, the link operation 624 may link the check 120 to the extracted payee name information entry by categorizing a check listing on an account statement 124 for the checking account. As such, the check listing may be included with other check listings defining checks 120 containing text matching the same payee name information entry extracted by the extract operation 622. Plainly stated, the check listings of checks issued to a single payee 116 may all be categorized as being issued to the payee, e.g., organized under a single payee name heading. Alternatively, the check 120 may be identified as being linked to the extracted payee name information entry on an account statement 124 by the payee name information entry being printed next to the check listing. It should be appreciated that there may be many other means for linking the check 120 to an extracted payee name. If the match operation 610 does not find a match for the text on the payee name field 306, or following the link operation 624, operation flow concludes with the terminate operation 626.

Figure 7:
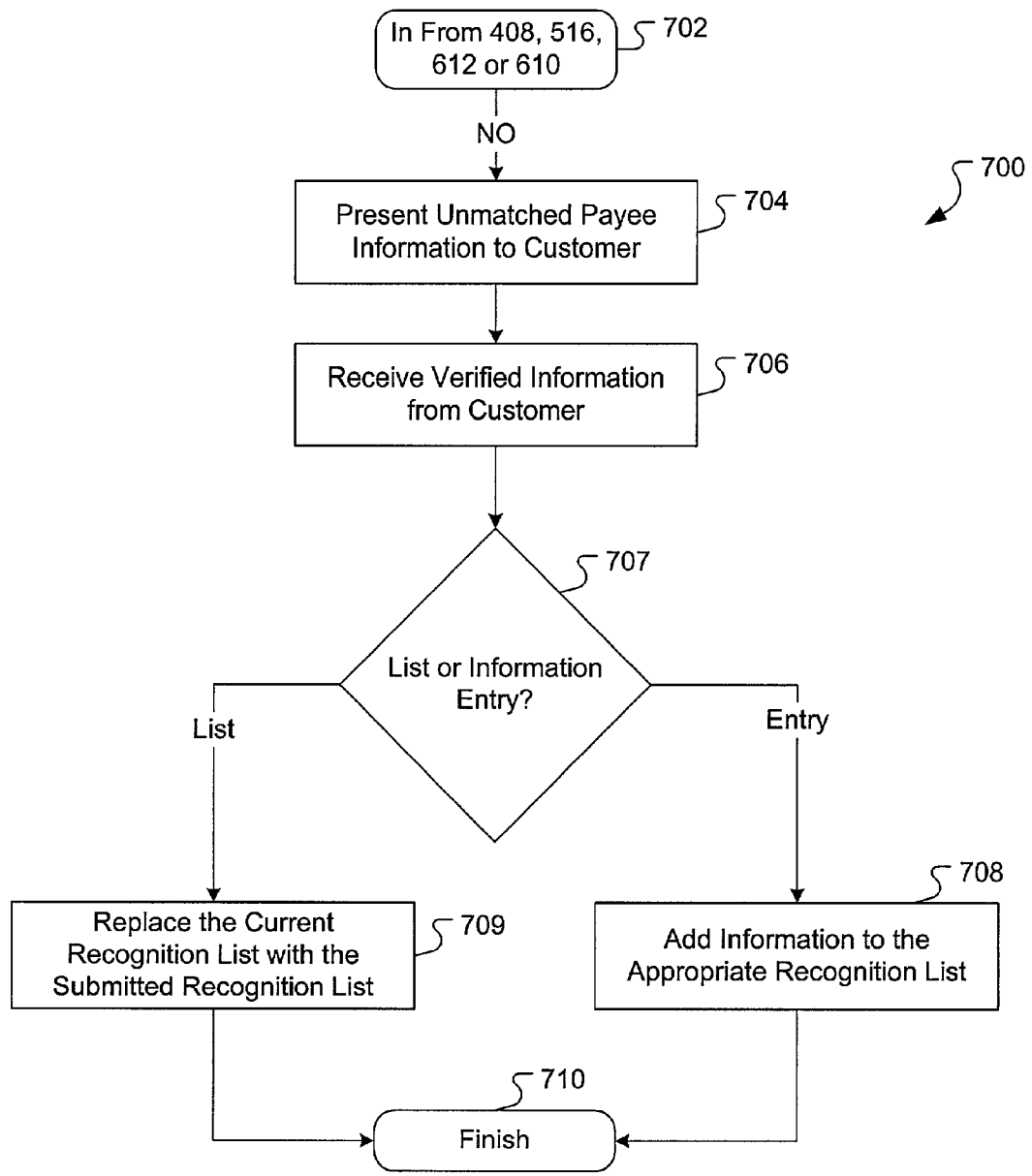
FIG. 7 is a flow diagram that illustrates operational characteristics for verifying unmatched text in accordance with an embodiment of the present invention.

FIG. 7 is a flow diagram illustrating operational characteristics associated with a verification process 700 in accordance with an embodiment of the present invention. The verification process 700 may be used under circumstances when a match is not found between text written or printed on a located information field and the information entries in an associated recognition list 104. As such, the verification process 700 may be initiated following either of the aforementioned match operations 408, 516, 610 and 612. The verification process 700 comprises an operation flow beginning with a start operation 702 and concluding with a terminate operation 710. Hence, if a match is not found between the text and the information entries in the recognition list 104 by either the match operation 408, the match operation 516, the match operation 610 or the match operation 612, operation flow passes from the start operation 702 to a present operation 704.

The present operation 704 presents the unmatched text on the located information field to the payor 102. The payor 102 to which the information is presented is preferably identified by the account number recognized by the examine operation 510. The unmatched text may be presented to the payor 102 either electronically or by hard copy. Indeed, the unmatched text may be presented to the payor 102 as the payor interacts with at least one Internet web page operated by either the payor's financial institution or the check processing system 106. Regardless of the medium of transmission for the unmatched text, the payor 102 receives the unmatched text and may submit a replacement recognition list 104 containing an information entry corresponding to the unmatched text. Alternatively, the payor 102 may submit a supplemental information entry corresponding to the unmatched text, rather than an entire updated recognition list 104. As described in greater detail with reference to an add operation 708 illustrated below, if a supplemental information entry is submitted, it is understood by the verification process 700 that an existing recognition list 104 is to be updated. The payor 102 may submit the supplemental entry or the replacement list 104 through interaction with an Internet web page operated by either the payor's financial institution or the check processing system 106. Once either a replacement recognition list 104 or an unmatched information entry is submitted by the payor 102, operation flow passes to a reception operation 706.

The reception operation 706 receives the replacement recognition list 104 or supplemental information entry submitted by the payor 102. Operation flow passes from the reception operation 706 to a query operation 707. The query operation 707 determines whether the payor 102 has submitted, and thus whether the verification process 700 has received, a replacement recognition list 104 to replace an existing recognition list 104 or a supplemental information entry to be added to an already existing recognition list 104.

If a supplemental information entry is received by the reception operation 706, operation flow passes to an add operation 708. The add operation 708 adds the supplemental information entry to the recognition list 104 stored in the restricted lexicon associated with the checking account number recognized by the examine operation 510. For instance, in an alternative embodiment having restricted lexicons storing multiple recognition lists 104 each being associated with a specific type of information, i.e., payee name or memo category information, the add operation 708 adds the supplemental information entry to the list 104 associated with the same information type as the entry. If the supplemental information entry relates to payee name information, the information entry is added to the payee name recognition list 104 stored in the restricted lexicon. Likewise, if the supplemental information entry is related to memo category information, the supplemental information entry is added to the memo category recognition list 104 stored in the restricted lexicon. Of course, in an embodiment having only a single recognition list 104 storing entries of multiple information types, the add operation 708 simply adds the supplemental information entry to the recognition list 104 of the restricted lexicon. Following the add operation 708, operation flow concludes at a terminate operation 710.

If a replacement recognition list 104 is received by the reception operation 706, operation flow passes to a replacement operation 709. The replacement operation 709 replaces an existing recognition list 104 stored in the restricted lexicon with the replacement recognition list 104. In accordance with a preferred embodiment, each restricted lexicon for a checking account has only a single recognition list 104 that contains entries for multiple types of information, i.e., payee name and memo category. As such, the replacement operation 709 replaces the existing recognition list 104 stored in the restricted lexicon with the replacement recognition list 104. In accordance with an alternative embodiment, the appropriate existing recognition list 104 may be defined as an existing recognition list 104 associated with the same type of information as the replacement recognition list 104. For instance, if the replacement recognition list 104 relates to payee name information, the existing payee name recognition list 104 stored in the restricted lexicon is replaced by the replacement payee name recognition list 104. Likewise, if the replacement recognition list 104 is related to memo category information, the existing memo category recognition list 104 stored in the lexicon is replaced by the replacement memo category recognition list 104. Following the replacement operation 709, operation flow concludes at the terminate operation 710.

Figure 8:
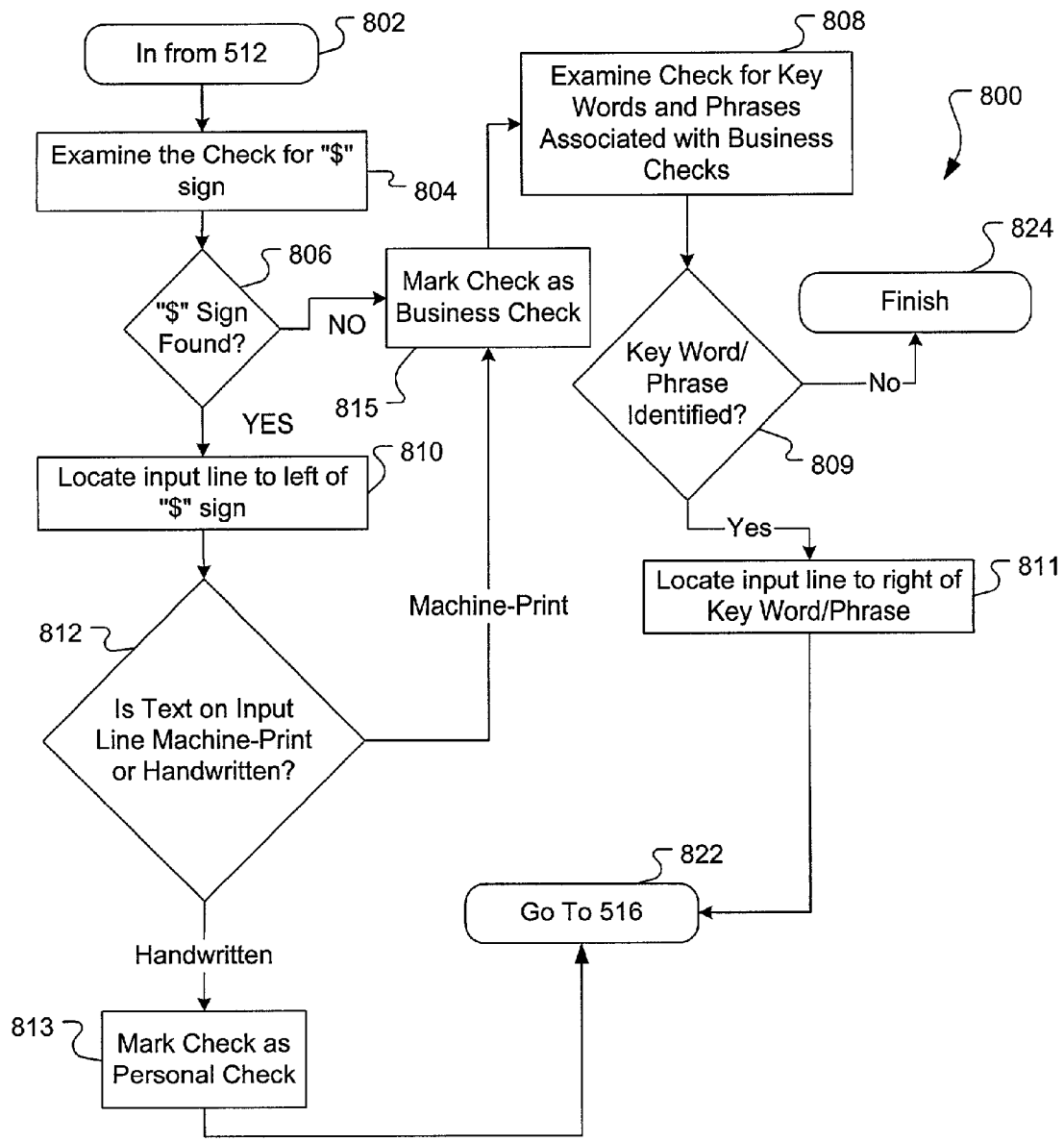
FIG. 8 is a flow diagram that illustrates operational characteristics for locating and recognizing text on a check in accordance with an embodiment of the present invention.

FIG. 8 shows a flow diagram more particularly illustrating operational characteristics of the locate operation 514 and the match operation 516 of the check processing procedure 500 shown in FIG. 5 in accordance with one embodiment of the present invention. Specifically, the flow diagram of FIG. 8 illustrates a locate and recognition process 800 for locating a specific information field on a check 120 and recognizing text written or printed on the information field. Once recognized, the text may be referred to as extracted textual information (see extract operations 520, 616 and 622). As such, the locate and recognition process 800 comprises an operation flow beginning with a start operation 802 and concluding with either a first terminate operation 824 or a second terminate operation 822. The start operation 802 follows the retrieve operation 512 after the checking account number has been recognized by the check processing procedure 500. Following the second terminate operation 822, operation flow continues to the check processing procedure 500 at the match operation 516.

Following the start operation 502, operation flow passes to an examine operation 804. The examine operation 804 examines the check 120 for a dollar ("$") sign, such as the text block 320 shown in FIG. 3. Operation flow then passes from the examine operation 804 to a query operation 806. The query operation 806 determines whether the examine operation 804 has identified a dollar sign ("$") 320 on the check 120. If a dollar sign ("$") has been identified on the check 120, operation flow passes to a personal check locate operation 810. The personal check locate operation 810 examines the check 120 to locate the input line 318 immediately adjacent to and below the dollar sign ("$") 320. By determining position of the input line 318, the payee name information field 306, which is generally positioned directly above the input line 318, may be readily located. Once the input line 318, and thus the payee name information field 306, are located, operation flow passes to an examine operation 812. The examine operation 812 examines the text written or printed on the payee name information field 306 to determine whether the text is machine-print or handwritten.

Referring back to the query operation 806, if the dollar sign ("$") is not located on the check 120, operation flow passes to a business check mark operation 815. The business check mark operation 815 marks the check as a business check 120, rather than a personal check. From the business check mark operation 815, operation flow passes to a business check locate operation 808. The business check locate operation 808 locates the payee name information field 306 using a business check recognition method. Unlike most personal checks, a business check may not have a payee name information field 306 directly adjacent to and slightly below the dollar sign ("$") on the check 120. Thus, separate methods for locating the payee name information field 306 must be used. In accordance with a preferred embodiment, the business check examine operation 808 examines the check 120 for key words and phrases typically associated with business checks and contained in a lexicon restricted to the key words and phrases. This lexicon is hereinafter referred to as a "business check key word lexicon." Several exemplary words or phrases that may be contained in the business check key word lexicon include, without limitation, "pay to the order of," "to the order of," and "To." The business check operation 808 compares text printed on various information fields on the check 120 to keywords and phrases contained in the business check key word lexicon to identify one of the keywords or phrases on the check. Following examination of the check 120 by the business check examine operation 808, operation flow passes to a query operation 809. The query operation 809 determines whether the business check examine operation 808 has identified a key word or phrase printed on the check 120. If the query operation 809 determines that the business check examine operation 808 has identified a keyword or phrase, operation flow passes to a business check locate operation 811. If, however, the query operation 809 determines that the business check examine operation 808 has not identified a key word or phrase printed on the check 120, operation flow terminates at the first terminate operation 824.

The business method locate operation 811 examines the check 120 to locate the payee name information field immediately to the right of the identified key word or phrase. Once the payee name information field is located, operation flow passes to the second terminate operation 822 and operation flow continues at the match operation 516 of the check processing procedure 500.

As noted above, the examine operation 812 determines whether text written or printed on the payee name information field 306 is machine-print or handwritten. If the text on the payee name information field 306 is machine-print, operation flows passes to a business check mark operation 815. The business check mark operation 815 marks the check 120 as a business check, rather than a personal check. From the business check mark operation 815, operation flow passes to the business check examine operation 808 and thereafter continues as previously described. Alternatively, if the examine operation 812 determines that the text on the payee name information field 306 is handwritten, operation flow passes to a personal check mark operation 813. The personal check mark operation 813 marks the check 120 as a personal check, rather than a business check. From the personal check mark operation 813, operation flow passes to the second terminate operation 822 and operation flow continues at the match operation 516 of the check processing procedure 500.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, an employee of the payor's financial institution may be presented with an unmatched payee name and thereafter submit a supplemental payee name information entry or recognition list to the verification process 700. Numerous other changes may be made which will readily suggest themselves to those skilled in the art and which are encompassed in the spirit of the invention disclosed and as defined in the appended claims.

What is claimed is:

1. A system for identifying a check with text located on the check, the check being issued from a checking account by a payor to a payee, the system comprising:
   a restricted lexicon containing a plurality of reference information entries being strings of characters predefined as identification information that may be written on the check;
   a text recognition module analyzing text on the check against the plurality of reference information entries in the restricted lexicon to identify an information entry as the interpretation for the text, wherein the text is memo category information identifying a particular memo category to which the check is associated; and an account statement generation module generating an account statement for the checking account and linking the check to the interpretation for the text on the account statement.

2. The system of claim 1, wherein the restricted lexicon is one of a plurality of restricted lexicons each associated with a separate checking account number and each containing information entries being strings of characters predefined as identification information that may be written on checks issued from the separate checking accounts, the system further comprising:

a checking account recognition module recognizing an account number on the check and selecting the restricted lexicon based on a match between the account number on the check and the checking account number associated with the restricted lexicon.

3. The system of claim 1, wherein the account statement generation module links the check with the interpretation on the account statement by labeling a listing of the check on the account statement with the interpretation for the text.

4. The system of claim 1, wherein the plurality of information entries are predefined by the payor.

5. A method for processing a check issued from a checking account by a payor to a payee, the method comprising:

receiving a recognition list having a plurality of information entries being strings of characters defined by the payor as memo categories that may be handwritten on the check;

locating a memo category handwritten on the check;

analyzing the handwritten memo category against each of the information entries in the recognition list to recognize one of the plurality of information entries as an interpretation for the handwritten memo category; and generating an account statement for the checking account detailing transactions of the checking account over a predetermined period of time and linking the check to the interpretation.

6. The method of claim 5, wherein the generating act comprises:

labeling a listing of the check on the account statement with the interpretation.

7. The method of claim 5, further comprising:

if the handwritten memo category does not match an information entry, providing the handwritten memo category to the payor for interpretation of the handwritten memo category.

8. The method of claim 7, wherein the providing act comprises:

presenting the handwritten memo category to the payor using an Internet server.

9. The method of claim 7, further comprising:

receiving a supplemental information entry submitted by the payor as the interpretation for the handwritten memo category; and updating the recognition list to include the supplemental information entry.

10. The method of claim 9, wherein the receiving act comprises:

receiving the supplemental information entry using an Internet server.

11. A method for processing a check issued from a checking account by a payor of the checking account to a payee, the method comprising:

receiving a field recognition list associated with the checking account, wherein the field recognition list includes a plurality of information entries predefined for the checking account to be expenses that may be input in a memo field on the check;

detecting the checking account number on the check;

selecting the field recognition list for the memo field of the check based on the checking account number; and analyzing text in the memo field of the check using the field recognition list to determine if the text in the memo field is recognized as one of the plurality of information entries in the field recognition list.

12. The method of claim 11, further comprising:

if the analyzed text is not recognized as an information entry in the field recognition list, electronically sending the text to the payor for recognition.

13. The method of claim 12, further comprising:

electronically receiving a supplemental information entry submitted by the payor for the text sent to the payor for recognition; and updating the field recognition list to include the supplemental information entry.

14. The method of claim 13, wherein the acts of electronically sending and electronically receiving are sending over the Internet and receiving via the Internet.

15. The method of claim 11, further comprising:

generating an account statement for the checking account detailing transactions of the checking account over a predetermined period of time, the statement identifying an expense for each check as recognized for the checks by the act analyzing.

16. The method of claim 11, further comprising:

if the analyzed text is not recognized as an information entry in the field recognition list, electronically sending the text to the payor for recognition, electronically receiving from the payor a replacement recognition list including a supplemental information entry submitted by the payor for the text sent to the payor for recognition; and replacing the recognition list with the replacement recognition list.

17. A method for processing a check issued from a checking account by a payor of the checking account to a payee, the method comprising:

receiving a first field recognition list associated with the checking account, wherein the first field recognition list includes a plurality of payee names predefined for the checking account;

receiving a second field recognition list associated with the checking account, wherein the second field recognition list includes a plurality of expenses predefined for the checking account;

detecting the checking account number on the check;

selecting the first field recognition list and the second field recognition list based on the checking account number; and analyzing payee text in a payee field of the check using the first field recognition list to determine if the payee text is recognized as one of the plurality of payee names in the first field recognition list; and analyzing memo text in a memo field of the check using the second field recognition list to determine if the memo text is recognized as one of the plurality of expenses in the second field recognition list.

18. The method of claim 17, further comprising:

generating an account statement for the checking account detailing transactions of the checking account over a predetermined period of time, the statement identifying a payee for each check as recognized for the check by the act of analyzing the payee text, and the statement identifying an expense for each check if an expense as recognized for the check by the act of analyzing the memo text.

19. A computer program product embodied in a computer readable medium and encoding a computer program of instructions for executing a computer process for processing a financial document issued on a financial account by an issuer of the financial document, the computer process comprising:
    receiving a field recognition list associated with the financial account, wherein the field recognition list includes a plurality of memo category names predefined for the financial account to be possible categories into which financial documents associated with the financial account may be categorized;
    detecting an account identifier for the financial account on the financial document;
    selecting the field recognition list based on the detected account identifier; and
    analyzing text in a memo field against the plurality of memo category names in the field recognition list to recognize the text as one of the plurality of memo category names in the field recognition list.

20. The computer process in the computer program product of claim 19, further comprising:
    if the text in the memo field is not recognized as one of the plurality of memo category names in the field recognition list, electronically transmitting the unrecognized text to the issuer for recognition.

21. The computer process in the computer program product of claim 20, further comprising:
    electronically receiving a supplemental memo category name submitted by the issuer, wherein the supplemental memo category name represents an interpretation for the unrecognized text; and
    updating the field recognition list to include the supplemental memo category name.

22. The computer process in the computer program product of claim 20, further comprising:
    electronically receiving a replacement field recognition list submitted by the issuer, wherein the replacement field recognition list comprises a supplemental memo category name representing an interpretation for the unrecognized text; and
    replacing the field recognition list with the replacement field recognition list.

23. The computer process in the computer program product of claim 19, wherein the financial document is a check.

24. The computer process in the computer program product of claim 19, further comprising:
    generating an account statement for the financial account detailing transactions of the financial account during a predetermined period of time, wherein the account statement associates the financial document with the memo category name recognized by the analyzing act.

25. The computer process in the computer program product of claim 19, wherein the memo field is one of a plurality of text fields and the field recognition list is one of a plurality of field recognition lists, the method further comprising:
    receiving a second field recognition list associated with a second text field on the financial document and associated with the financial account, the second field recognition list having a plurality of predetermined information entries that are defined based on the second text field and the financial account and that may be in the second text field;
    wherein the selecting act further comprises selecting the second field recognition list based on the detected account identifier; and
    wherein the analyzing act further comprises analyzing text in the second text field against the plurality of predetermined information entries in the second field recognition list to determine if the text is recognized as one of the information entries in the second field recognition list.

26. The computer process in the computer program product of claim 25, further comprising:
    storing the field recognition list and the second field recognition list in a lexicon;
    storing the lexicon in a data store as one of a plurality of lexicons each specifically associated with at least one of a plurality of financial accounts, wherein the lexicon is specifically identified in the data store as being associated with the financial account using the account identifier; and
    wherein the selecting act selects the lexicon from the plurality of lexicons based on the detected account identifier.

27. The computer process in the computer program product of claim 25, wherein the financial document is a check and the issuer is a payor, and wherein the text in the second text field represents a payee name, the second field recognition list being a list of possible payee names defined as being names for possible payees of checks issued from the financial account.

* * * * *